(12) United States Patent
Bose et al.

(10) Patent No.: US 9,421,141 B2
(45) Date of Patent: Aug. 23, 2016

(54) SYSTEMS AND METHODS FOR PROMOTING LOCOMOTION AND FACILITATING EXERCISE

(75) Inventors: Prodip K. Bose, Gainesville, FL (US); Floyd J. Thompson, Gainesville, FL (US)

(73) Assignee: University of Florida Research Foundation, Inc., Gainesville, FL (US)

(\*) Notice: Subject to any disclaimer, the term of this patent is extended or adjusted under 35 U.S.C. 154(b) by 346 days.

(21) Appl. No.: 14/126,643

(22) PCT Filed: Jun. 19, 2012

(86) PCT No.: PCT/US2012/043096
§ 371 (c)(1),
(2), (4) Date: Dec. 16, 2013

(87) PCT Pub. No.: WO2012/177604
PCT Pub. Date: Dec. 27, 2012

(65) Prior Publication Data
US 2014/0114217 A1   Apr. 24, 2014

Related U.S. Application Data

(60) Provisional application No. 61/498,752, filed on Jun. 20, 2011.

(51) Int. Cl.
*A61H 1/02* (2006.01)
*A61H 1/00* (2006.01)
*A01K 15/02* (2006.01)

(52) U.S. Cl.
CPC ............... *A61H 1/00* (2013.01); *A61H 1/0214* (2013.01); *A01K 15/02* (2013.01); *A61H 2201/1215* (2013.01); *A61H 2201/164* (2013.01); *A61H 2201/1635* (2013.01); *A61H 2201/1652* (2013.01); *A61H 2201/5061* (2013.01); *A61H 2201/5069* (2013.01); *A61H 2203/03* (2013.01)

(58) Field of Classification Search
CPC ... A61H 1/00; A61H 1/02; A61H 2001/0207; A61H 2001/0211; A61H 1/0214; A61H 1/0237; A61H 1/024; A61H 1/0244; A61H 1/0262; A61H 1/0266; A61H 1/0274; A61H 1/0277; A61H 1/0281; A61H 2203/0481; A61H 2203/0487; A61H 2203/03; A61H 3/00; A61H 3/008; A01K 15/02; A01K 15/027; A63B 22/06; A63B 22/0605; A63B 23/0476; A63B 69/16; A63B 22/0002; A63B 21/00181; A47D 13/04
USPC .......................................... 119/700, 702, 703
See application file for complete search history.

(56) References Cited

U.S. PATENT DOCUMENTS 2,144,206 A * 1/1939 Thompson ............. A63B 19/04
472/17
4,587,960 A * 5/1986 Schotten ............... A61H 1/0214
482/57

(Continued)

FOREIGN PATENT DOCUMENTS

JP      2005192695 A    7/2005
JP      2009045009 A    3/2009

OTHER PUBLICATIONS

The International Search Report and Written Opinion dated Feb. 28, 2013.

*Primary Examiner* — Justine Yu
*Assistant Examiner* — Michael Tsai
(74) *Attorney, Agent, or Firm* — Thomas | Horstemeyer, LLC

(57) ABSTRACT

In one embodiment, a therapy apparatus includes a support, a body harness mounted to the body support, a gearbox positioned below the harness, the gearbox comprising at least one gear and supporting a crankshaft, crankarms mounted to the crankshaft, and pedals mounted to the crankarms, a driveshaft coupled to the at least one gear such that rotation of the driveshaft results in rotation of the crankshaft, crankarms, and pedals, and a motor that drives the driveshaft, wherein the apparatus is adapted to support part of the weight of an subject with the harness and part of the weight of the subject with the pedals and wherein rotation of the pedals due to operation of the motor provides therapy to the subject.

19 Claims, 13 Drawing Sheets

(56) References Cited

U.S. PATENT DOCUMENTS

| | | | |
|---|---|---|---|
| 5,839,995 A * | 11/1998 | Chen | A63B 22/001 280/304.1 |
| 7,285,076 B2 | 10/2007 | Kelly | |
| 2002/0157617 A1 | 10/2002 | Reinkensmeyer et al. | |
| 2004/0140643 A1 | 7/2004 | Gomez | |
| 2008/0134434 A1 * | 6/2008 | Celauro | A61H 1/02 5/610 |
| 2008/0234113 A1 * | 9/2008 | Einav | A61B 5/1116 482/66 |
| 2012/0316035 A1 * | 12/2012 | Andreasen | A61H 1/0214 482/7 |

* cited by examiner

SYSTEMS AND METHODS FOR PROMOTING LOCOMOTION AND FACILITATING EXERCISE

CROSS-REFERENCE TO RELATED APPLICATION(S)

This application is the 35 U.S.C. §371 national stage of PCT application PCT/US2012/043096, filed Jun. 19, 2012, which claims priority to and the benefit of U.S. Provisional Application Ser. No. 61/498,752, filed Jun. 20, 2011, both of which are hereby incorporated by reference herein in their entirety.

FEDERAL SPONSORSHIP

This invention was made with government support under Grant No. 5R01NS044293 awarded by The National Institutes of Health. The government has certain rights in the invention.

BACKGROUND

Exercise therapy is the central to mission goals of the rehabilitation sciences. New locomotor training and pharmacological approaches, alone or in combination, have been identified as important factors to modify the recovery process for patients with disabilities resulting from neurotrauma or neurodegenerative disorders. Thus, it is important to understand the basic mechanism by which the locomotor therapy facilitates recovery in such cases. Moreover, the expression of molecules related to recovery may provide pharmacological targets for further improvement.

Partial body supported treadmill training has been shown to be effective to improve locomotor function after neurotrauma or neurodegenerative disorders (e.g., spinal cord injury, traumatic brain injury, strokes, multiple sclerosis etc.). However, this intervention is largely institutional, labor intensive, and the insurance industry does not reimburse the costs associated with this intervention. Thus, only a small percentage of affected people benefit from this therapy. It can therefore be appreciated that it would be desirable to have an alternative locomotor therapy to provide to patients with disabilities resulting from neurotrauma or a neurodegenerative disorder.

BRIEF DESCRIPTION OF THE DRAWINGS

The disclosed systems and methods can be better understood with reference to the following drawings. The components in the drawings are not necessarily drawn to scale.

DETAILED DESCRIPTION

As described above, it would be desirable to have an alternative therapy for patients with disabilities resulting from neurotrauma or a neurodegerative disorder. Disclosed herein are embodiments of exercise bicycles that can be used to provide such therapy. The disclosed bicycles can be used to study the effectiveness of bicycle exercise therapy and compare it to treadmill training. While the bicycles that are disclosed herein are intended for rodents, the principles that apply to rodent rehabilitation can be extended to other animals, including humans. Accordingly, this disclosure is intended to extend to exercise bicycles intended for use by substantially any animal.

Although partial body supported treadmill training shows promise, bicycle exercise is less labor intensive and could be used in a home setting. However, there is a lack of preclinical data for this exercise modality. Thus, needed is an apparatus that can be used to test the therapeutic efficacy and investigate whether the underlying mechanism of improvement is similar to partial body supported treadmill training. As described below, two motorized rodent bicycles (one bipedal and one quadripedal) have been developed to promote locomotion and facilitate exercise-based neuroplasticity-mediated improvement of rodents suffering from a spinal injury.

Figure 1:
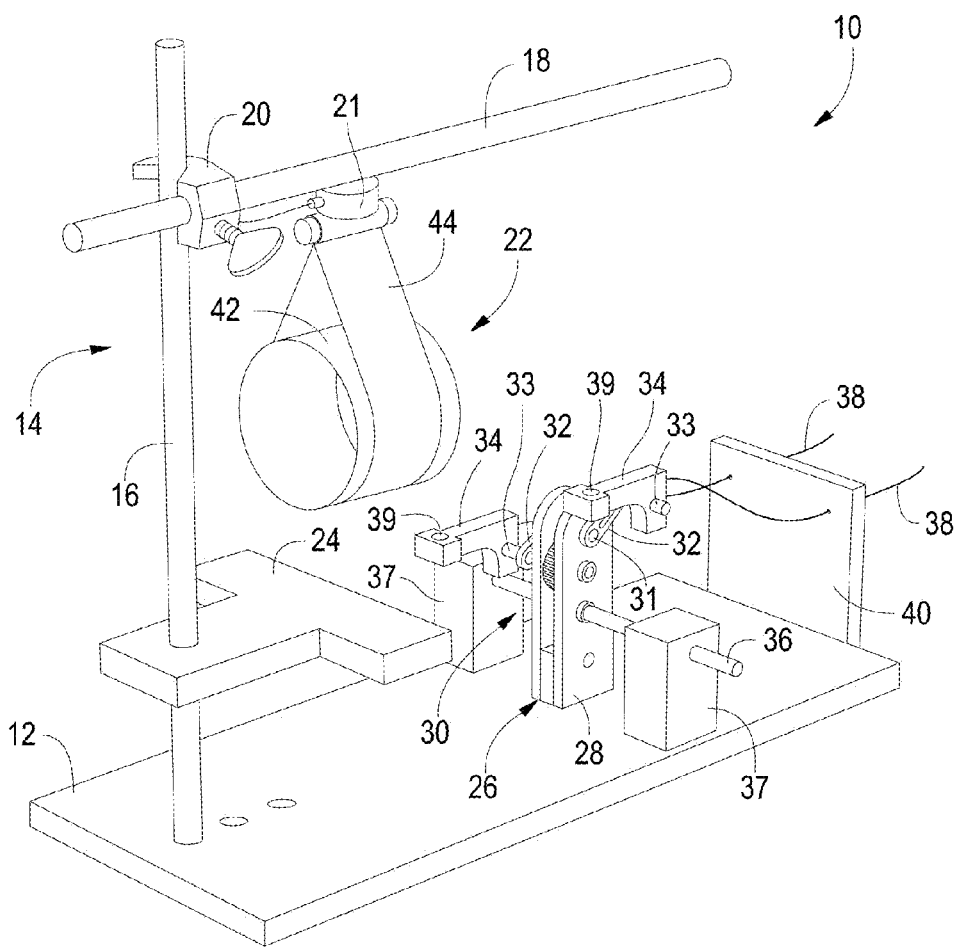
FIG. 1 is a perspective view of a first embodiment of a rodent exercise bicycle apparatus.

FIG. 1 illustrates an embodiment of a rodent exercise bicycle apparatus 10. More particularly, illustrated in FIG. 1 is an example of a bipedal rodent exercise bicycle apparatus 10. As is shown in FIG. 1, the apparatus 10 includes a platform or base 12 from which upwardly extends a body support 14 that comprises a vertical post 16 and a horizontal support beam 18 that is mounted to the post with a locking collar 20. Suspended from the support beam 18 is a body harness 22 that is designed to wrap around the body of the rodent to at least partially support the rodent's weight. In some embodiments, a weight sensor 21, such as a load cell, is positioned between the harness 22 and the beam 18 so that the amount of weight supported by the harness can be determined. Also mounted to the post 16 is a support platform 24 upon which the front legs of the rodent can be placed to provide further support to the rodent when suspended.

Also mounted to the base 12, below the support beam 18, is a gearbox 26. In the illustrated embodiment, the gearbox 26 includes a frame 28 to which one or more internal gears 30 are rotatably mounted. One of the gears 30 is mounted to a crankshaft 31 to which right and left crankarms 32 are mounted on opposite sides of the frame 28. Rotatably mounted to the ends of the crankarms 32 are pedal shafts 33 to which pedals 34 are rotatably mounted.

Figure 2:
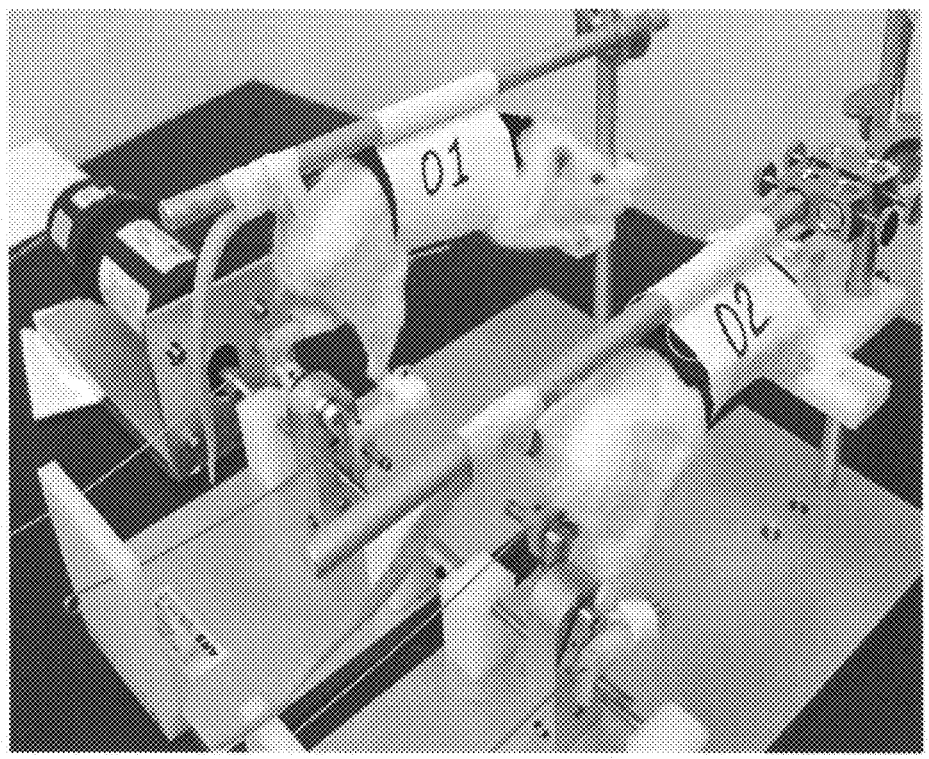
FIG. 2 is an image of rodents mounted to rodent exercise bicycles, the bicycles having a construction similar to that shown in FIG. 1.

As is further shown in FIG. 1, a driveshaft 36 extends through the gearbox 26 such that its longitudinal axis is parallel to the longitudinal axis of the crankshaft 31. Another gear 30 of the gearbox 26 is fixedly mounted to the driveshaft 36 such that when the driveshaft is rotated about its longitudinal axis, its gear likewise rotates. In some embodiments, the driveshaft 36 is supported to the sides of the gearbox 26 by support blocks 37, which are mounted to the base 12. The driveshaft 36 is adapted to be driven by an electric drive motor (not shown) that also comprises part of the apparatus 10 (see example of FIG. 2).

The apparatus 10 further includes weight sensors 39, such as pressure transducers, that are associated with the pedals 34 that can measure the amount of force being supported by the pedals. As is shown in FIG. 1, guide wires 38 can extend rearward from the pedals 34 and through a back plate 40 that is also mounted to the base 12 to maintain a desired (e.g., generally horizontal) orientation of the pedals.

In some embodiments, the gearbox 26 includes a direct-drive gearbox sub-assembly that comprises three meshed A-type spur gears in vertical linear alignment, with a bottom and a top pinion gear having 16 teeth and a 0.5 inch pitch diameter (PD) and a center idler gear having 32 teeth and a pitch diameter of 1.0 inch. By way of example, all three gears can have a 20 degree pressure angle (PA), 0.190 inch width, 0.760 inch center-to-center distance, and a 1:2:1 gear ratio. The top and bottom pinion gears can be made from NYLATRON® 66 and the center idler gear can be made from DELRIN®. All three gears can be press fit onto their respective shafts. In some embodiments, each gear can be press fit onto a stainless steel 316L 0.250 inch shaft that is fed through TEFLON® PFA shaft bushings press fit in both sides of the gearbox frame 28, which can be made from 6060 aluminum. A similar configuration of gears is shown in FIG. 12B.

With further reference to FIG. 1, the bottom pinion gear of the gearbox 26 is the input drive gear and can be meshed to the driveshaft 36, which can be a 0.250 inch OD×12 inch long 10 threads per inch worm gear driveshaft that runs down the centerline of the gearbox underneath the bottom drive gear and can be directly coupled to the drive motor through a shaft coupling. The input drive pinion gear in turn connects to the top pinion output gear (mounted on the pedal shaft 33) through a center idler gear that is used to increase spacing between the input and output shafts without using belts, chains, or pulleys. The final gear ratio can be 1:1 to the motor shaft. The direct-drive motor assembly can be a continuously variable 0-to-100 revolutions-per-minute (rpm) permanent magnet 90V DC motor with a built-in 31:1 gear-reduction box that produces 13 in-lbs. of torque and has a built-in all solid-state motor speed-controller and 120V AC power-supply mounted on an adjustable aluminum base that directly attaches to the driveshaft 36 to the side of the apparatus 10.

In some embodiments, the pedals 34 are laterally adjustable and made from ultra-high molecular weight polyethylene. As is apparent from FIG. 1, the pedals 34 can be T-shaped to better accommodate the rodent's feet. In some embodiments, each pedal has a 4-40 set screw that allows for adjustment of the width between the right and left pedals along their pedal shafts 33.

In some embodiments, the harness 22 includes a custom-made elastic (flexible & breathable) body wrap 42 and an elastic support harness sling 44 that attaches the body wrap by hook-and-loop fasteners (e.g., Velcro®).

Animal experiments were performed to test the efficacy of the apparatus described above. Thirty Sprague Dawley specific pathogen free (SPF) rats (12 weeks old, weighing 220-260 gm at the start of the study; Charles Rivers Laboratory, USA) were used in the experimentation. Contusion injuries were produced using a MASCIS impactor and protocol. Briefly, a 10 gm MASCIS impactor was dropped from a 2.5 cm height onto the $T_8$ segment of the spinal cord exposed by laminectomy under sterile conditions. Each animal received Ampicilin (s.q.) twice each day starting at the day of surgery for a total of 5 days. The procedure was performed under ketamine (100 mg/kg)-xylazine (6.7 mg/kg) anesthesia. The animals were kept under vigilant postoperative care, which included daily examination for signs of distress, weight loss, dehydration, and bowel and bladder dysfunction. Manual expression of bladders was performed 2-3 times daily as required, and the animals were monitored for the possibility of urinary tract infection. Animals were housed in pairs (except for a brief post-operative recovery period).

At postoperative (PO) day 7, velocity-dependent ankle torque and open field locomotion were assessed by the Basso, Beattie, Bresnahan (BBB) scoring scale to obtain measures of spasticity and injury severity respectively. If any animal did not fall within certain preset scores (ankle torque at 612 deg/sec angular rotation, 160-220 kdyne, and BBB scores >5 at PO day 7), it was considered too mildly injured and eliminated from the study to reduce the variability. Out of a total of 42 animals, 30 animals qualified for the preset criteria. The animals (n=30) were then randomly divided into three equal groups (n=10 each). Two groups were assigned for treadmill and cycling locomotor trainings, and the third group did not receive training (contused control for both groups), but was routinely checked.

A three-runway treadmill (Columbus Instrument, OH, USA) and two custom-made bicycles were used in this study for locomotor training. A rodent motorized rat bicycle was designed and custom built to promote locomotion in accordance to the above disclosure (see FIG. 2). The animals were trained over the course of 3 months. The training schedule was performed 5 days a week using two 20 minute trials/day, starting from PO day 8 in both training paradigms. On the first day of training, the rats were given five minutes to explore the treadmill and then encouraged to walk on the moving treadmill (11 meters per minute (mpm)) for a series of four, five-minute bouts of walking. The rats were given a minimum of five minutes rest between bouts. On the second day of training the rats walked for two bouts of ten minutes each, twice a day, and then day 3 through 90, the rats were trained to walk for 20 minutes without a rest with at least 2 hours interval between trails. The first seven days the bodyweight was supported as needed using the support and the harness attached to the support. This enabled the clinicians to assist limb locomotion with their hands to promote normal walking during treadmill locomotion. After seven days, the bodyweight was only supported as needed.

The bicycle exercise regimen involved suspending the rats on the rat harness (see FIG. 2) with the hind feet strapped onto the pedals with cotton tape. The exercise consisted of a pedaling motion, which fixed one limb while extending the other without overstretching the limbs. The cycling speed was 31 rotations/minutes (around 11 mpm distance-wise). During the first two days, the bicycle training period and protocol were the same as those of treadmill training. During the first week of training, the rat's tails were attached to the support beam with surgical tape to maintain the trunk stability during exercise. However, following the second week of training, the load was gradually increased by positioning the body harness towards the chest so that the hind portion of the body was shifted over the pedals.

The lengthening resistance of the triceps surae muscles was measured indirectly by quantifying ankle torque and EMGs during 12 degrees dorsiflexion ankle rotation. Prior to data acquisition, the animals were given a brief pre-recording period to adjust to the recording procedure by providing them with 12 degree ankle rotations produced at 3 second intervals at eight different velocities (49, 136, 204, 272, 350, 408, 490, and 612. degrees/sec). The rats were immobilized in a custom designed trunk restraint without trauma or apparent agitation. All recordings were performed in awake animals. The proximal portion of the hind limbs to the midshank were secured in a form-fitted cast that immobilized the limb while permitting normal range of ankle rotation (60 to 160 degrees). The animals typically adjusted to the restraint device without detectable discomfort and were provided fruit to sniff or chew as a distraction.

The neural activity of the triceps surae muscle was measured using transcutaneous EMG electrodes. The electrode was inserted in a skin fold over the distal soleus muscle just proximal to the aponeurotic convergence of the medial and lateral gastrocnemii into the tendonocalcaneousus. The reference electrode was placed in a skin fold over the greater trochanter. A xylocaine 2% jelly (Lidocaine HCl, Astra USA Inc.) was applied over the electrode insertion points to minimize pain during recording. The data recording session began when the animal was relaxed and the protocol spanned approximately 45 minutes. At each test velocity, five consecutive sets of waveforms, 10 waveforms per set (a total 50 waveforms/velocity), were recorded, signal averaged, and saved for subsequent analysis. A complete protocol for each animal was recorded during each of two separate recording sessions performed on separate days. Therefore, the data set for each animal for each test velocity was the signal average of 100 trials (50 per session×2 sessions). The data were signal averaged upon acquired using a digital signal acquisition system and LabView graphic programming (Version 5.0, National Instrument).

Rate-depression was assessed using a non-invasive procedure. The animals were anesthetized by i.p. injection of ketamine 100 mg/kg and immobilized in a prone position on the recording table using surgical tape. Ketamine was selected due to its minimal depression of monosynaptic reflex and because it does not alter the time course of presynaptic inhibition. Core body heat was maintained via heat lamp. The hair overlying the distal tibial nerve at the ankle was removed using a cosmetic hair removing gel. A bipolar stimulating electrode with 1 mm silver ball was applied to the ankle surface and just enough electrode gel to coat the tip of the electrode applied to the skin. A monopolar surface EMG recording electrode was applied to the plantar skin overlying the lateral plantar (digital interosseus) muscles. The reference was applied to the skin surface of the fifth digit. A ground electrode was applied to the skin surface between the stimulating and the recording electrode to minimize shock artifact. The distal tibial nerve was stimulated using 200 μsec current pulses, according to a preset protocol to determine H-reflex threshold and H-max, M-wave threshold and M-max. An H-recruitment curve was then made to locate the minimum intensity for the maximal reflex amplitude. The frequency protocol was performed at this intensity and was adjusted slightly during the frequency series to maintain a constant M-wave amplitude (an assurance of a constant effective stimulus delivery to the distal tibial nerve). The frequency series was included with 0.3 Hz set as control and seven test frequencies: 0.5, 1, 2, 3, 4, 5, and 10 Hz. The data set for each frequency was 32 consecutive waveforms that were signal averaged upon acquired using a digital signal acquisition system and LabView graphic programming (Version 5.0, National Instrument). Rate-depression at each test frequency was quantified by comparison of reflex amplitude and area to the 0.3 Hz control.

Graph paper was placed on the treadmill and the rats' hind limbs were inked. The rats were then placed on the treadmill (20×40 cm) surface at the practiced speed, 11 mpm. Axial angle of rotation, and base of support were analyzed from these footprints. The angle of rotation is the angle measurement found by drawing a line through the center of the third toe and the center of the heel of two consecutive paw prints. The base of support was the distance between two consecutive prints. Thus, hind limb gait abnormalities were measured from footprints obtained at pre-injury, and 1 through 3 months flowing training using both trained and untrained contused animals.

The Basso, Beattie, and Bresnahan (BBB) open field locomotor scale was applied to score the early, intermediate, and late phases of recovery following locomotor training. The 21-point scale is based on the observation that after spinal cord contusion rats progressed through three general phases of recovery. The early phase is characterized by little or no hindlimb joint movement (scores 0 through 7), the intermediate phase includes bouts of uncoordinated stepping (scores 8 through 13), and the late phase involves fine details of locomotion such as dragging of the toes and tail, trunk instability, and rotation of the paws (scores 14 through 21). The animals were placed in a test apparatus, observed for 4 minutes, and scored in real time by double-blinded observers. All open field locomotor testing was video-taped for further analysis and review.

Analysis of variance (ANOVA) was used to detect differences in ankle torques and EMGs values obtained at each velocity from precontused, contused, treadmill-and-cycle exercised animals. Ankle torques and corresponding EMG values were obtained at pre-injury time point from each group were also tested by ANOVA. In addition, a repeated measures ANOVA (RM ANOVA) was used to test the group differences in ankle torque or EMGs across PO weeks. Data from H-reflex, footprints, BBB, and histological experiments were analyzed by using ANOVA to assess treatment effects from contused and time-matched normal control groups. The level of significant difference was set for all analysis was $p \leq 0.05$. Significant differences were marked with asterisks (*) or ^ according to their respective p values: *, compared with pre-injury values; ^, compared with contused controls. Values were expressed as the mean value ±standard error of the mean (SEM) in all graphs.

Figure 3:
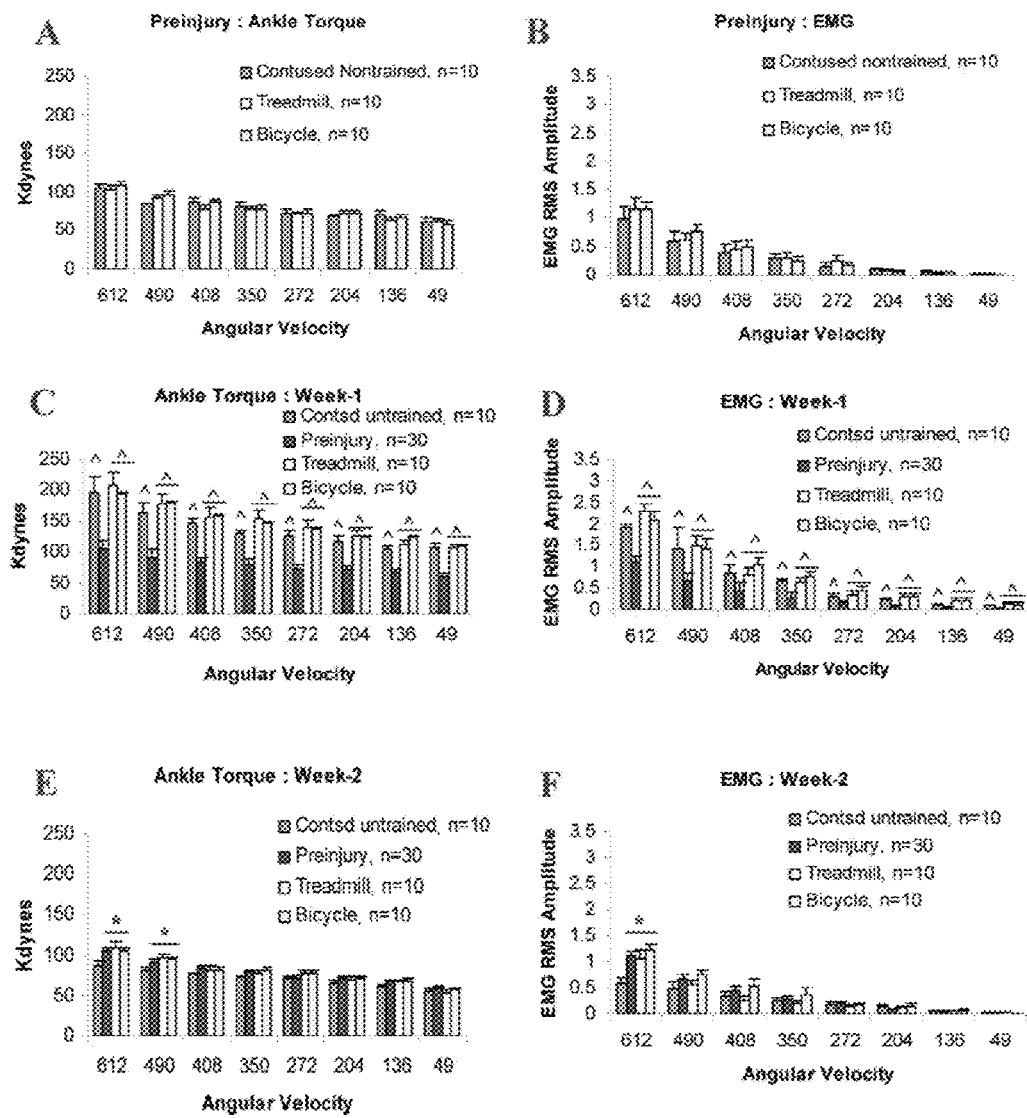
FIGS. 3A-3F are test data graphs of velocity-dependent ankle torque (A, C, and E) and time-locked EMG-RMS magnitude (B, D, and F) of pre-contusion and post-contusion subjects in weeks 1 and 2.

Baseline measures of velocity-dependent ankle torques and extensor EMGs were obtained from all animals before injury (FIGS. 3A and 3B), at post-injury weeks 1 and 2, and then at alternate weeks up to PO week 12. When tested at one week following injury, all three groups revealed significantly increased magnitudes of ankle torque during rotation at each of the eight ankle rotation velocities compared to the control values recorded before injury. There was no difference between these three groups, as shown in FIG. 3C (ANOVA). The EMG-RMS magnitudes time-locked with increased ankle torques that were recorded at each of the test velocities were also significantly greater compared with those recorded before injury (FIG. 3D).

At post-injury week 2, a pattern of significant hypo-reflexia was observed in the untrained contused group (FIGS. 3E and 3F). However, ankle torque and triceps surae EMG magnitudes recorded from the two trained groups at the end of post-contusion week two did not demonstrate this pattern of hypo-reflexia, but decreased from the week 1 values and were similar to data observed in pre-contusion animals (FIGS. 3E and 3F). Moreover, there was no difference between the data recorded from these two training groups at this post-injury time point.

By week 4 post-injury, a significant velocity-dependent ankle extensor spasticity re-appeared in the untrained contused group (FIGS. 4A and 4B). However, this second appearance of spasticity occurred only during the faster ankle (dynamic) rotations and was no longer observed during the low velocity (tonic) rotations. Tests at all later time points revealed that this significant dynamic velocity-dependent increase in ankle torque was enduring. Surprisingly, at this post-injury time point, this re-emergent spasticity was not observed in either of the two training groups (FIGS. 4A and 4B). At this point, ankle torque and EMG magnitudes did not increase significantly at the four fastest ankle rotation velocities (350-612 deg/sec) compared with the untrained contused animals (FIGS. 4A and 4B). Moreover, at the end of PO week 6 (following 5 weeks of training), increased ankle torque and EMG magnitudes were not observed at the four fastest ankle rotation velocities, as were clearly evident in the untrained contused animals (FIGS. 4C and 4D).

Figure 4:
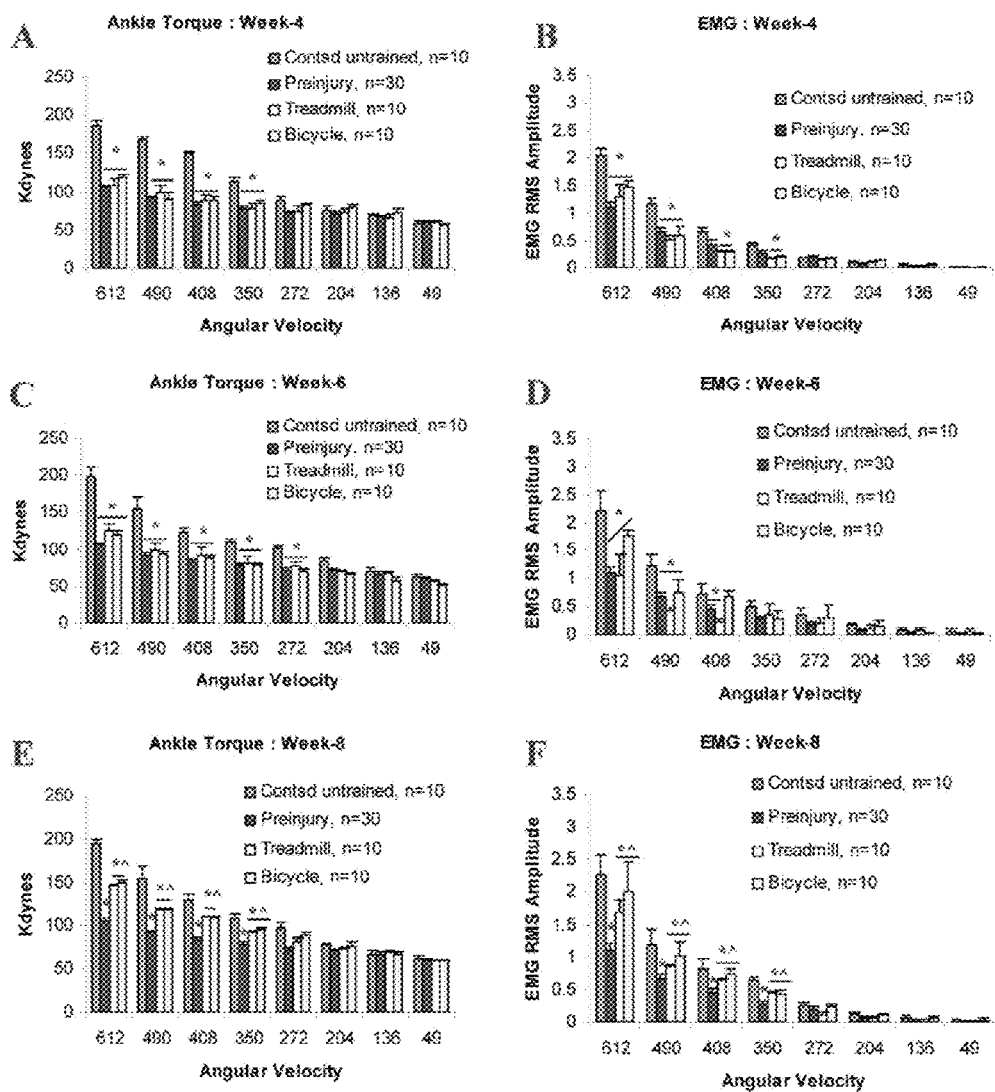
FIGS. 4A-4F are test data graphs of velocity-dependent ankle torque (A, C, and E) and time-locked EMG-RMS magnitude (B, D, and F) of post-contusion subjects in weeks 4 through 8.
Figure 5:
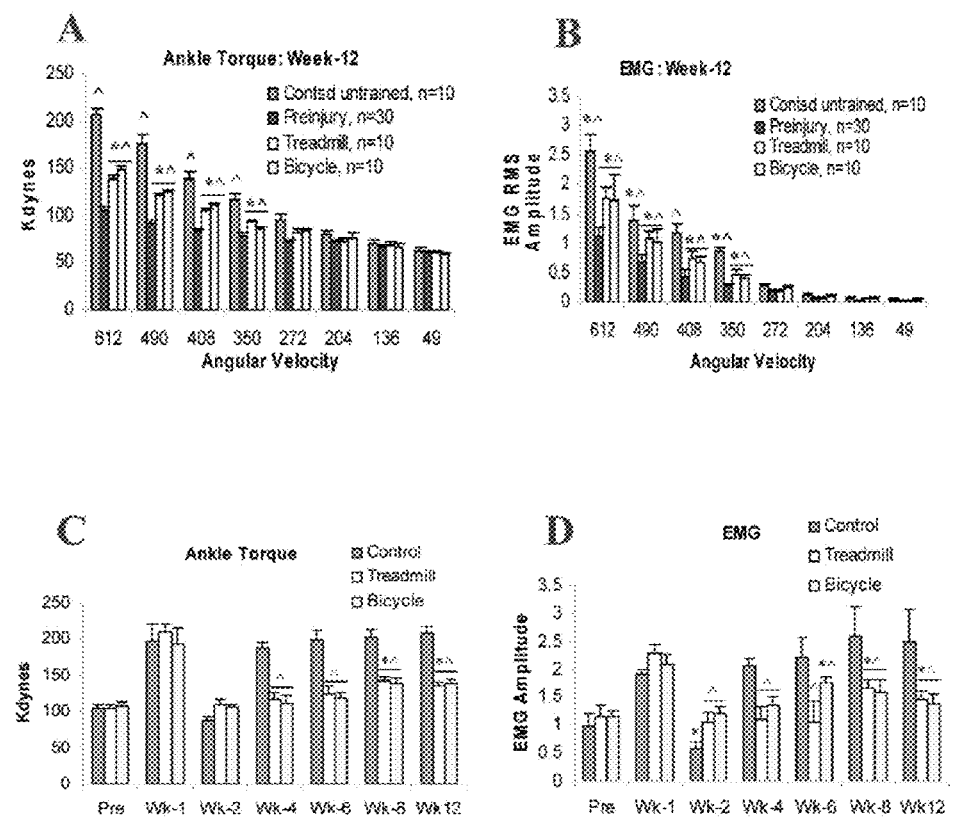
FIGS. 5A-5D are test data graphs that illustrate the effects of 3-month locomotor training (treadmill and bicycle) on ankle torque (A), extensor muscle EMGs (B) in animals with midthoracic contusion injury, the time course of velocity-dependent ankle torque (C), and time-locked EMG-RMS magnitude (D) over 12 weeks.

At post-contusion weeks 8 through 12, an increase in the velocity-dependent ankle torque was observed in both treadmill and bicycle training groups. This appeared at the four fastest ankle rotation velocities (350-612 deg/sec) and was of lower magnitude compared with values recorded in the untrained contused control group (FIGS. 4E, 4F, 5A, 5B, 5C, 5D). The mean torque and EMG values recorded at these rotation velocities from these trained groups were also increased and were intermediate in magnitude compared with corresponding values recorded from pre-injured normal and untrained contused groups. No significant increases in ankle torque or EMG magnitude was observed during ankle rotations at the slowest four velocities at postcontusion week 4 through week 12 (FIGS. 4 and 5). It is important to note also that there was no significant difference between the treadmill and bicycle group in ankle torques or EMGs recorded during post-injury week 4 through 12.

Figure 6:
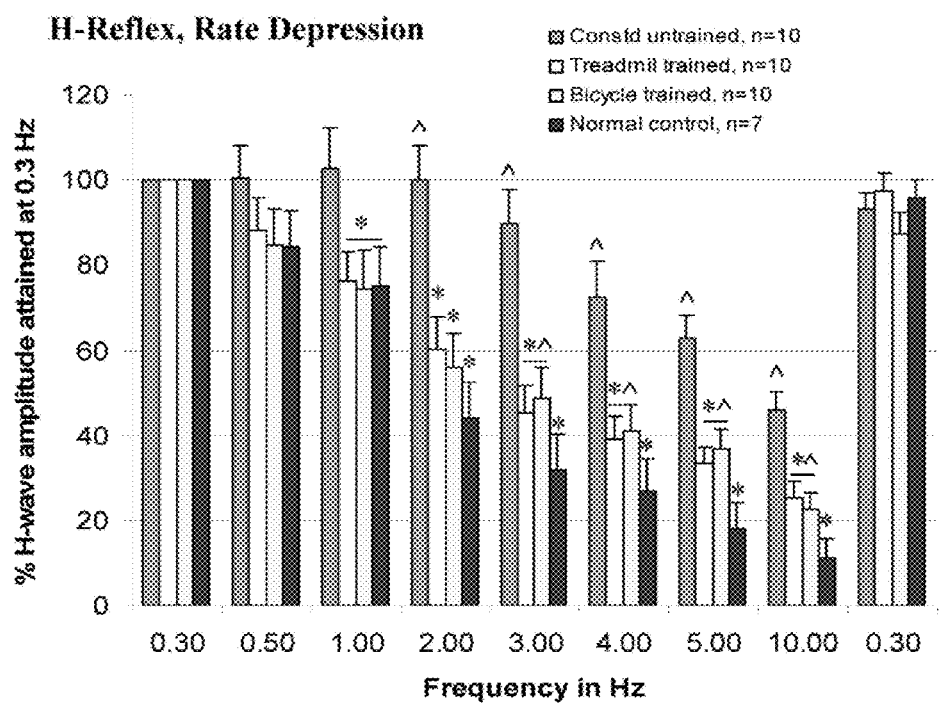
FIG. 6 is a test data graph of the rate depression of H-reflex at 1 Hz through 10 Hz test frequencies.

Rate-depression of the tibial/plantar H-reflexes was tested before injury and at three months post-injury in the trained and untrained injury groups. Compared with pre-injury controls, rate-depression was significantly reduced in the untrained group at each of the test frequencies from 1 through 10 Hz. By contrast, the rate depression observed in the trained animals was intermediate in amplitude between the pre-injury controls and the untrained animals at 1-10 Hz (see FIG. 5). Further, the rate-depression produced in the trained animals in response to test frequencies of 1-2 Hz, was similar to that recorded in the normal controls (FIG. 6). Similar magnitudes of rate-depression were observed in bicycle and treadmill trained animals.

Figure 7:
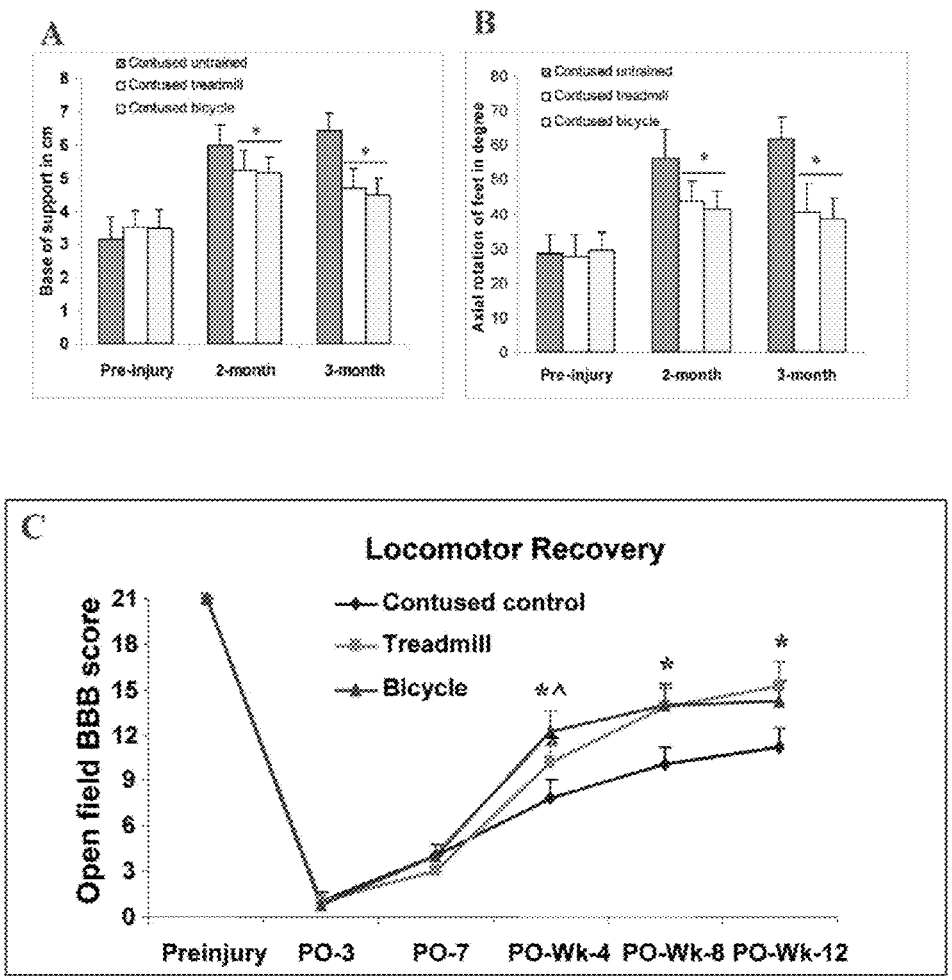
FIGS. 7A-7C are test data graphs of axial hind limb rotation (A) and base of support (B) in both treadmill and bicycle training groups compared with untrained contusion group at 2nd and 3rd month, and locomotor recovery (C).

Footprint analyses were performed before injury, at two, and three months post-injury. Before injury, the limb axis and base of support were measured to be 30.25±5.9 and 3.29±0.51, respectively. By comparison, these measures were 55.78±6.58 and 6.03±0.42 in the untrained animals at 2 months post-injury. Similar values, 57.62±6.84 and 6.52±0.52, respectively, were measured at three months. Compared with the pre-injury control values, these measures revealed that limb axis and base of support were significantly increased in the untrained contusion-injured animals. In the two to three month locomotor training groups, limb axis and base of support were observed to be 41.37±4.85 (at two months), 40.35±5.87 (at three months) and 5.04±0.32 (at two months), 4.52±0.48 (at three months) respectively. These measurements were significantly less altered than those observed in the untrained animals (FIGS. 7A and 7B). However, no significant difference in hind limb rotation or base of support was observed between the two training groups (ANOVA) at two or three months following training (FIGS. 7A and 7B).

Open field locomotor behavior was scaled (BBB) in both trained and untrained animals before injury and at 4, 8, and 12 weeks post-injury to evaluate recovery during the early, intermediate, and late phases of recovery.

At week 4, untrained contused animals displayed extensive movement of all three joints of the hindlimb, however, these animals could not support their body weight (mean score, 7.8±1.2). In contrast, treadmill trained animals showed occasional to frequent weight supported plantar steps, however, no forelimb-hindlimb (FL-HL) coordination (mean score, 10.2±1.07) was observed. Interestingly, bicycle trained animals displayed frequent to consistent weight supported plantar steps and occasional to frequent FL-HL coordination (mean score, 12.2±1.4). This BBB score in the bicycle trained group was significantly greater (p<0.05, ANOVA) than observed in either the untrained and the treadmill trained groups (FIG. 7C).

At post-contusion week 8, the untrained control animals showed occasional to frequent weight supported plantar steps without FL-HL coordination (mean score 10.0±1.24), whereas both treadmill and bicycle trained animals showed consistent weight supported plantar steps and frequent to consistent FL-HL coordination (mean score, bicycle, 13.8±1.3, treadmill, 14.0±1.4). Both of the BBB scores in the locomotor trained groups were significantly greater (p<0.05, ANOVA) than the scores determined for the untrained group.

At the final stage of training (week 12), the contused untrained control animals showed frequent to consistent weight-supported plantar steps, and no to occasional FL-HL coordination (mean score: 11.25±1.25) (FIG. 7C). However, in this stage, animals of both trained groups showed consistent FL-HL coordinated and consistent weight supported steps (mean scores, bicycle: 14.25±1.4, treadmill: 15.25±1.7). Moreover, these trained animals showed occasional dorsal stepping and rotated paw positioning during their locomotion. Occasional toe clearance was also observed in some trained animals (in both groups).

In summary, open field locomotor recovery scores scaled at postcontusion weeks 4, 8, and 12 were significantly greater in both of the training groups compared with untrained controls (FIG. 6C). The bicycle-training group demonstrated the highest recovery score at post-injury 1 month, which was also significantly greater than the treadmill group (FIG. 7C). However, at 8 and 12 weeks post-contusion, both training groups showed similar recovery scores (ANOVA).

Figure 8:
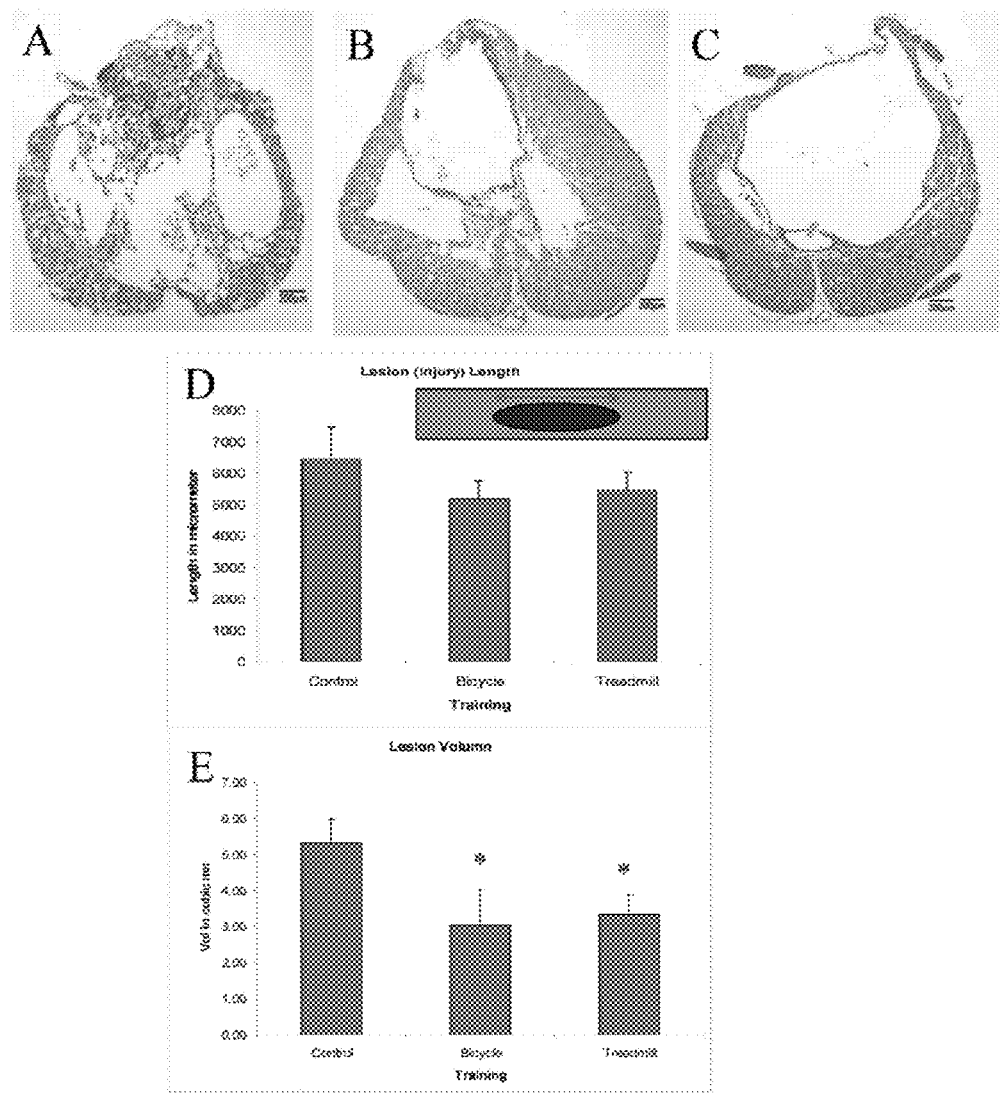
FIGS. 8A-8C are microscopic images of spared tissue in locomotor-trained animals.
FIGS. 8D and 8E are test data graphs of lesion length (D) and lesion volume (E).

Both locomotor trained groups exhibited decreased lesion volumes (rostro-caudal extension) and more spared tissue at the lesion site. Histological studies indicated that both the injured-bicycle trained group and the injured-treadmill trained group had shorter lesion lengths, and significant smaller lesion volume than the injured-untrained controls (FIGS. 8D and 8E). The measured lengths of lesion for the three different treatment groups showed bicycle-trained rats to have the shortest mean length (5178.3+/−559.5 µm), followed by treadmill-trained rats (5441.4+/−549.9 µm), and finally by the control rats (6438.0+/−1019.1 µm). The difference in lesion lengths among the three treatment groups was not significant, but there was a noticeable trend. The lesion volumes for the three different treatment groups showed bicycle-trained rats to have significantly the shortest mean volume (mean+/−SEM) (3.03+/−0.98 mm$^3$), followed by treadmill-trained rats (3.33+/−0.55 mm$^3$), and finally by the control rats (5.31+/−0.67 mm$^3$). Light microscopic qualitative studies of spared tissue revealed better preservation of myelin, axons, and collagen morphology in locomotor trained animals (FIGS. 8A and 8C). Importantly, these data indicate that the therapeutic efficacy of ergonomically practical cycle training was more effective in preserving spared tissue than more labor-intensive treadmill training.

Figure 9:
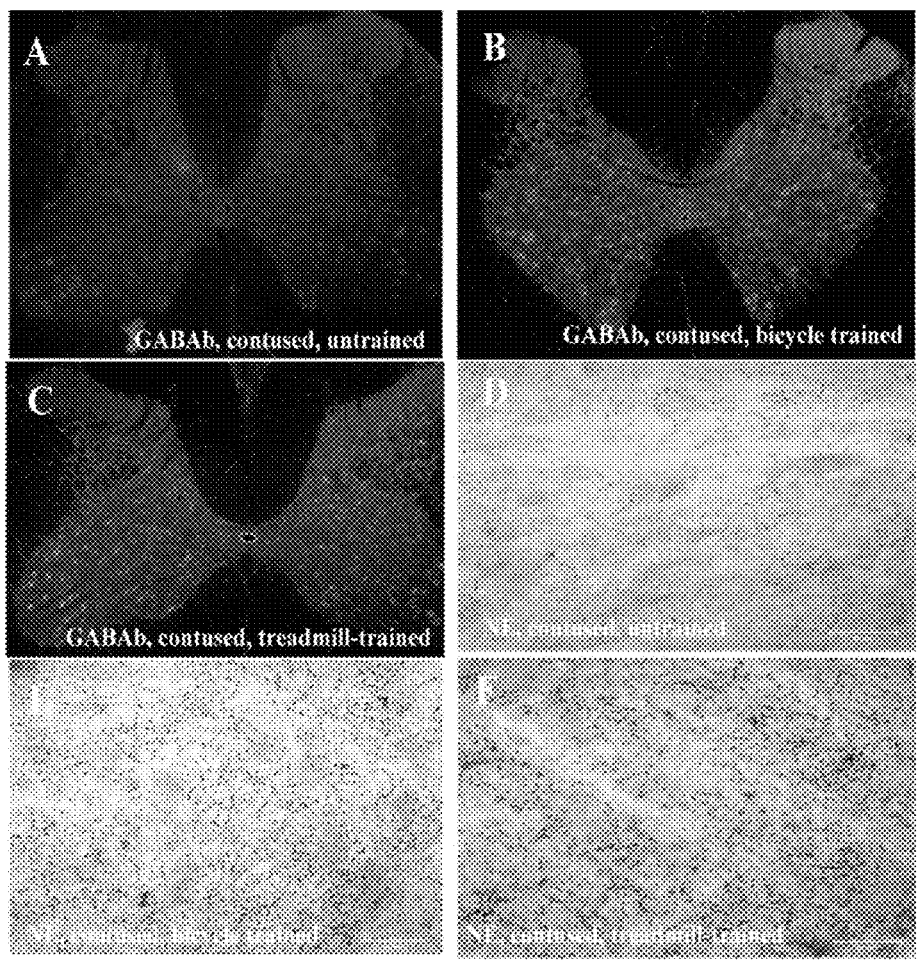
FIGS. 9A-9F are microscopic images of the immunohistochemistry of lumbar spinal cord showing up-regulation of GABAb receptors (A, B, and C), and sprouting of dopamine-beta-hydroxylase (DBH) positive noradrenergic (NE) projecting fibers in the ventral horn of the lumbar spinal cord in both types of locomotor training (E and F) compared with contused untrained controls (D).
Figure 10:
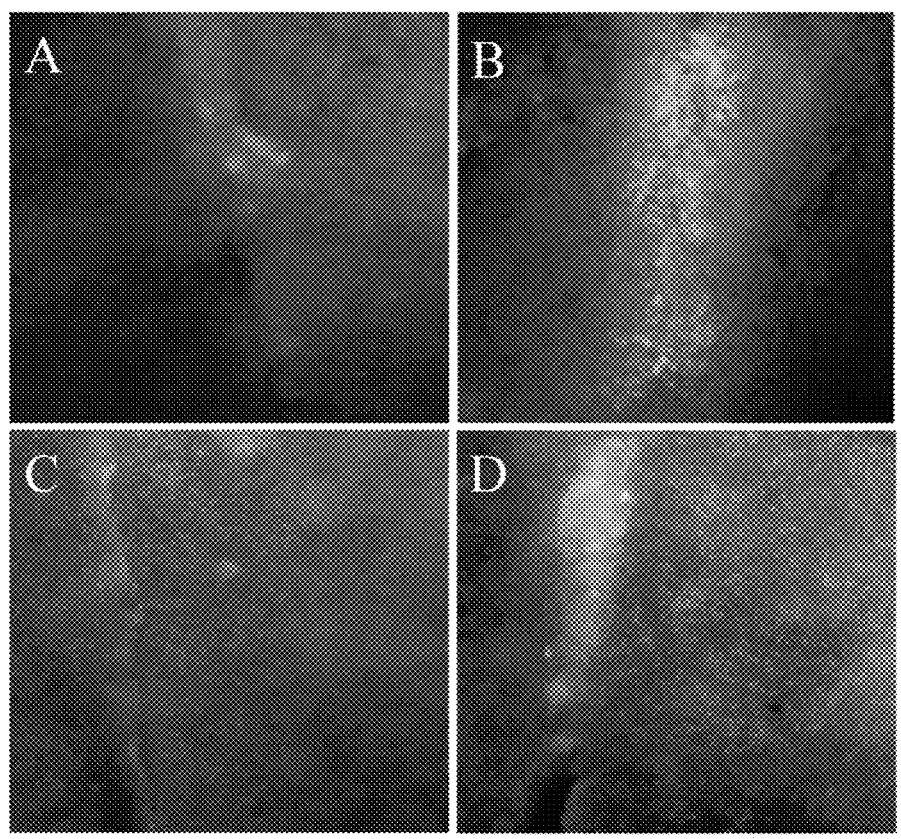
FIGS. 10A-10D are microscopic images of the immunohistochemistry of the thoracic (T10) spinal cord (B) following 1 week of bicycle locomotor training compared with a contused untrained control (A), and immunoreactivity (D) in the same area compared with an untrained contused control (C).
Figure 11:
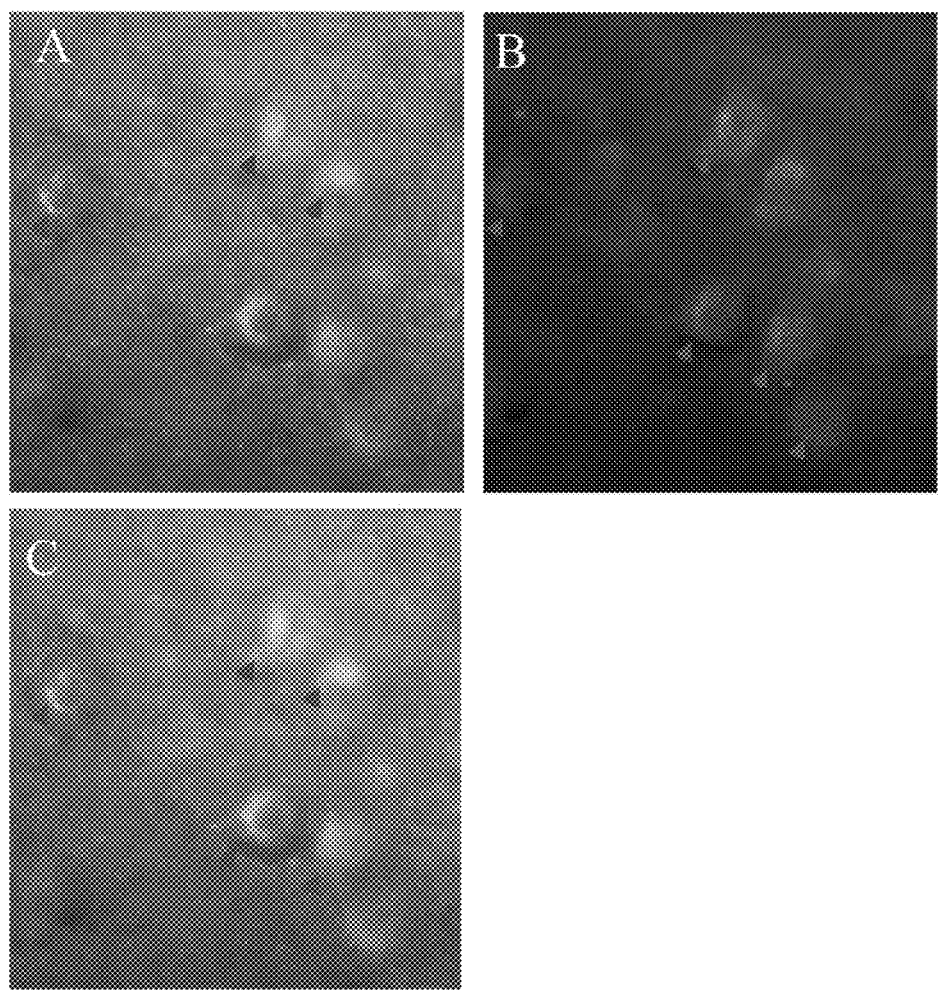
FIGS. 11A-11C are microscopic images showing a diffuse staining in cell bodies and fibers as well as punctate staining in the VH (A) and immunostained motoneuron cell bodies also stained with BDNF (B; C is the merged panels A and B).

A robust increase in the immuno-expression of $GABA_b$ receptors and NE fiber sprouting was observed throughout the lumbar spinal gray of both trained animals compared with tissues from untrained animals (FIG. 9). Moreover IHC studies indicated upregulation of $GAD_{67}$, and BDNF immunoreactivity at $T_{10}$-$T_{11}$ (immediately below the injury epicenter at $T_8$) especially areas adjacent to dorsal median septum and ventral horn following 1 week of bicycle locomotor training (PO 2 weeks) (FIG. 10). Interestingly, double IHC showed expression and co-localization of $GAD_{67}$ and BDNF in the ventral horn (VH) motoneurons (FIG. 11). $GAD_{67}$ showed a diffuse staining in cell bodies and fibers as well as punctate staining in the VH (FIG. 11), and those $GAD_{67}$ immunostained motoneuron cell bodies also stained with BDNF (FIG. 11C and merged panels of FIGS. 11A and 11B).

Figure 12A:
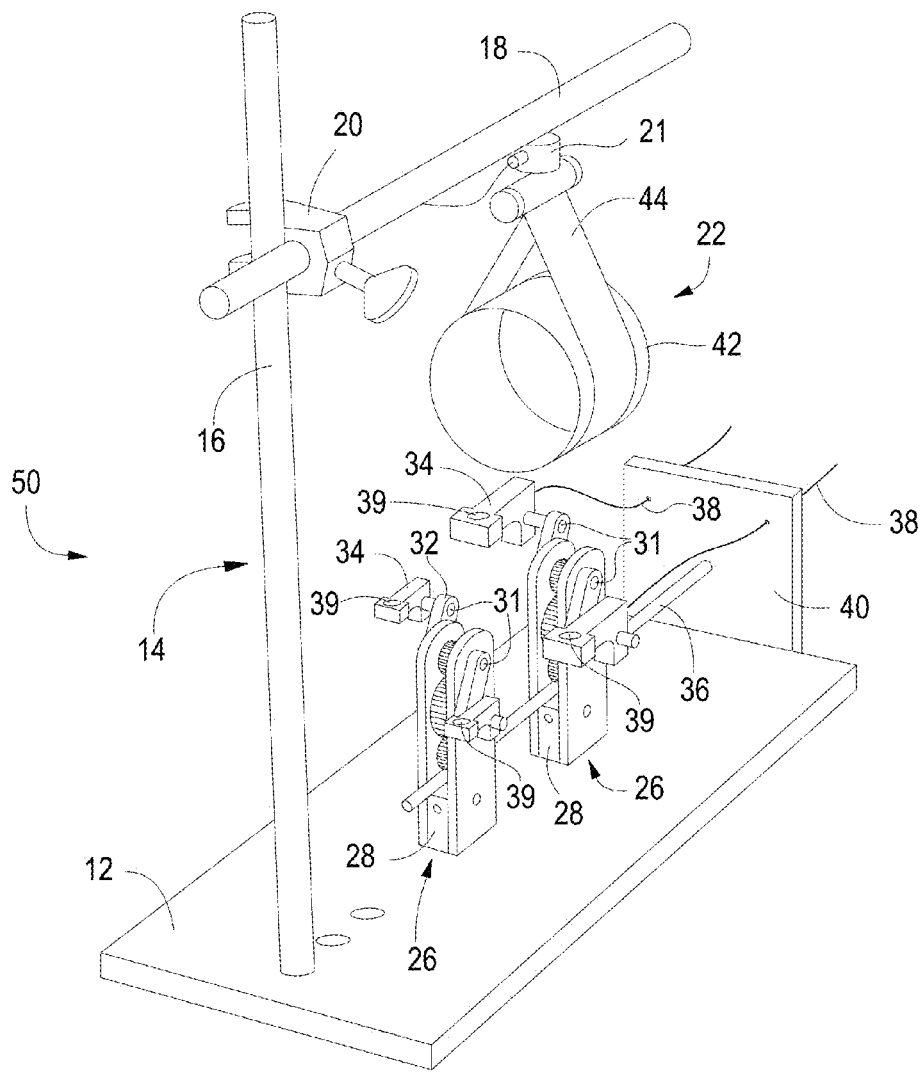
FIG. 12A is a perspective view of a second embodiment of a rodent exercise bicycle apparatus.
Figure 12B:
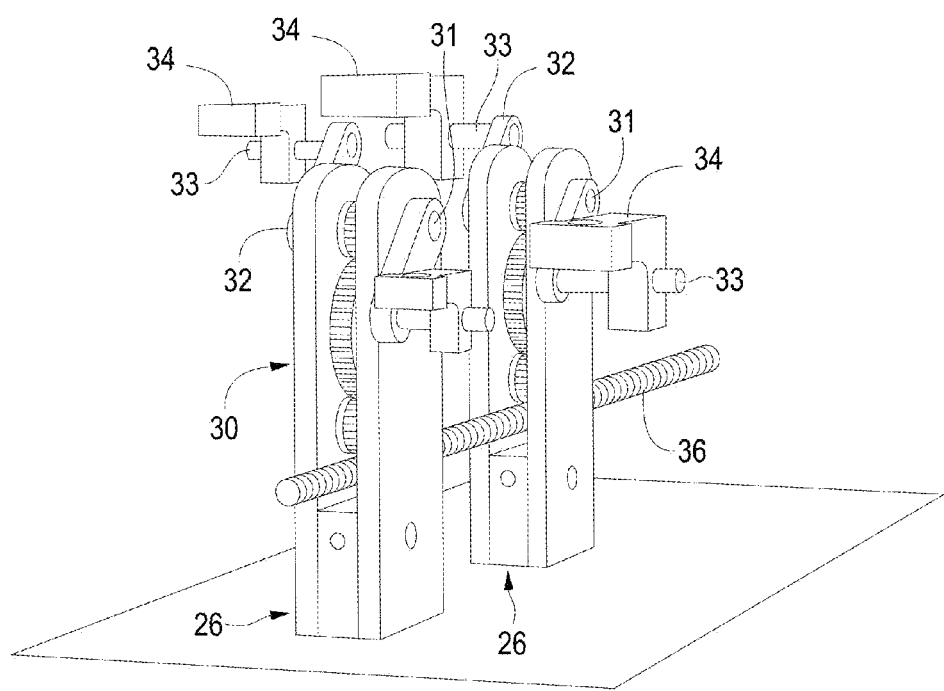
FIG. 12B is a perspective detail view of gear boxes of the rodent exercise bicycle apparatus shown in FIG. 12A.

FIGS. 12A and 12B illustrate a further embodiment of a rodent exercise bicycle apparatus 50. More particularly, illustrated in those figures is an example of a quadripedal rodent exercise bicycle apparatus 50. As shown in FIG. 12A, the apparatus 50 includes many of the same components as the apparatus 10. Those components have been described above and will not be discussed again in relation to FIGS. 12A and 12B. The apparatus 50, however, includes two gearboxes 26, one for the rodent's front legs and one for the rodent's hind legs. In addition, the support platform 24 (FIG. 1) has been removed and the driveshaft 36 is longitudinally aligned with the rodent's body instead of being transversely aligned with the rodent as with the apparatus 10 of FIG. 1.

In some embodiments, the driveshaft 36 comprises a direct-drive worm gear shaft that couples to both gearboxes 26 directly to the drive motor and turns all pedals 34 at the same speed (see FIG. 12B). In such an embodiment, a longitudinal axis of the driveshaft 36 is perpendicular to the crankshafts 31. Two guide wires 38 maintain the desired orientation (e.g., horizontal) of the rear pedals 34, while the front pedals 34 can be freely pivoted. In some embodiments, the driveshaft's ends can be keyed to allow multiple bikes to operate in series on a single drive motor.

Using the above-described apparatus, therapy can be provided to rodents with neurotrauma and/or neurodegerative disorders. Because the bicycle apparatus is motorized, the rodent need not be able to move the pedals of the apparatus on its own. However, because the legs are used to support at least part of the body weight, the legs are loaded and therapeutic sensory feedback from the skin, joints, muscle, and bone is provided to the nervous system. In some embodiments, a relatively small percentage of the body weight is supported by the legs during initial therapy and, over time, a greater and greater percentage of the body weight is supported by the legs by reducing the amount of support provided by other elements. This can be achieved by changing the position of the harness (i.e., moving it forward along the body of the rodent) and by removing the tail support. In some embodiments, approximately 17-25% of the body weight is supported by the legs in the first weeks of therapy with the goal of increasing that percentage to approximately 50% of the body weight in later weeks. The bicycle can be operated in the range of approximately 30-100 rpm depending upon the condition of the rodent.

As noted above, although the bicycle apparatuses described herein are specifically designed for rodents, similar bicycle apparatuses can be designed for other animals, including humans. Although the configuration of the apparatus would be changed to suit the body of the animal, the underlying principles of the therapy are the same.

We claim:

1. A therapy apparatus comprising:
   a support;
   a body harness mounted to the support;
   a gearbox positioned below the harness, the gearbox comprising at least one gear and supporting a crankshaft, crankarms mounted to the crankshaft, and pedals mounted to the crankarms, wherein a guide wire is associated with each pedal that is adapted to maintain a generally horizontal orientation of the pedal;
   a driveshaft coupled to the at least one gear such that rotation of the driveshaft results in rotation of the crankshaft, crankarms, and pedals; and
   a motor that drives the driveshaft;
   wherein the apparatus is adapted to support part of the weight of a subject with the harness and part of the weight of the subject with the pedals and wherein rotation of the pedals due to operation of the motor provides therapy to the subject.

2. The apparatus of claim 1, wherein the support comprises a post and a beam that extends from the post, wherein the body harness is suspended from the beam.

3. The apparatus of claim 2, further comprising a sensor positioned between the body harness and the beam that is adapted to sense the amount of the subject's weight supported by the harness.

4. The apparatus of claim 1, wherein the body harness includes an elastic body wrap and an elastic sling.

5. The apparatus of claim 1, wherein the gearbox comprises a first gear mounted to the crankshaft, a second gear coupled to the driveshaft, and a third gear positioned between and engaging the first and second gears.

6. The apparatus of claim 5, wherein the third gear is fixedly mounted to the driveshaft.

7. The apparatus of claim 6, wherein a longitudinal axis of the driveshaft is parallel to a longitudinal axis of the crankshaft.

8. The apparatus of claim 5, wherein the driveshaft has wormgear threads that mesh with teeth of the third gear.

9. The apparatus of claim 8, wherein a longitudinal axis of the driveshaft is perpendicular to a longitudinal axis of the crankshaft.

10. The apparatus of claim 1, further comprising a platform mounted to the support that is adapted to support front legs of the subject and wherein the pedals are adapted to support hind legs of the subject.

11. The apparatus of claim 1, further comprising a sensor associated with each pedal that can sense the amount of the subject's weight supported by the pedal.

12. The apparatus of claim 1, wherein the apparatus is sized and configured to be used by a rodent subject.

13. The apparatus of claim 12, further comprising a second gearbox positioned below the harness, the second gearbox comprising at least one gear and supporting a crankshaft, crankarms mounted to the crankshaft, and pedals mounted to the crankarms, the second gearbox being adapted for use by front legs of the subject.

14. The apparatus of claim 13, wherein the driveshaft is also coupled to the at least one gear of the second gearbox.

15. The apparatus of claim 14, wherein the second gearbox comprises a first gear mounted to the crankshaft, a second gear coupled to the driveshaft, and a third gear positioned between and engaging the first and second gears.

16. The apparatus of claim 15, wherein the driveshaft has wormgear threads that mesh with teeth of the third gear.

17. A method for providing therapy to a subject, the method comprising:
  securing feet of the subject to pedals of a bicycle apparatus, wherein the apparatus including a guide wire being associated with each pedal that is adapted to maintain a generally horizontal orientation of the pedal;
  supporting at least part of the subject's weight with a harness; and
  driving the pedals of the bicycle apparatus to provide therapy to the subject.

18. The method of claim 17, wherein the subject is a rodent.

19. The method of claim 18, wherein securing feet comprises securing the front feet to a first pair of pedals and securing the hind feet to a second pair of pedals, both pairs of pedals being driven by a motor.

* * * * *